United States Patent
Guinn et al.

(10) Patent No.: US 10,618,455 B2
(45) Date of Patent: Apr. 14, 2020

(54) TUNABLE IMPACT FEATURE IN AUTOMOTIVE LAMPS

(71) Applicant: Valeo North America, Inc., Troy, MI (US)

(72) Inventors: Brian Guinn, Seymour, IN (US); John Orisich, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 328 days.

(21) Appl. No.: 15/395,879

(22) Filed: Dec. 30, 2016

(65) Prior Publication Data

US 2018/0186275 A1 Jul. 5, 2018

(51) Int. Cl.
*B60Q 1/04* (2006.01)

(52) U.S. Cl.
CPC .................... *B60Q 1/0491* (2013.01)

(58) Field of Classification Search
CPC .................................................. B60Q 1/0491
USPC .................... 296/187.09, 187.1, 187.04
See application file for complete search history.

(56) References Cited

U.S. PATENT DOCUMENTS

| | | | | |
|---|---|---|---|---|
| 6,450,676 B2 * | 9/2002 | Maeda | ................. | B60Q 1/0433 362/369 |
| 6,698,820 B2 * | 3/2004 | Nakata | ................. | B60R 21/34 293/120 |
| 7,029,154 B2 * | 4/2006 | Arlon | ................. | B60Q 1/0491 296/187.09 |
| 2007/0214845 A1 * | 9/2007 | Gilleo | ................. | B60R 21/0428 70/208 |
| 2009/0256370 A1 | 10/2009 | Siler et al. | | |
| 2015/0091331 A1 * | 4/2015 | Takei | ................. | B62D 25/081 296/192 |
| 2015/0198301 A1 * | 7/2015 | Yasuda | ................. | B60Q 1/04 362/546 |

FOREIGN PATENT DOCUMENTS

| | | |
|---|---|---|
| CN | 102811888 B | 12/2012 |
| CN | 104039601 A | 9/2014 |
| CN | 102498314 B | 1/2015 |
| EP | 1655173 B1 | 4/2010 |
| JP | 406321002 A * | 11/1994 ........... B60Q 1/0491 |

\* cited by examiner

*Primary Examiner* — Joseph D. Pape
(74) *Attorney, Agent, or Firm* — Oblon, McClelland, Maier & Neustadt, L.L.P.

(57) ABSTRACT

An apparatus and a method for an automotive lamp are provided. The apparatus includes a housing made of plastic having an impact groove formed on a surface of the housing, wherein the impact groove is designed as a function of a depth, a width, a desired force, a cross section, and a profile to cause a designed rupture upon application of an applied force.

12 Claims, 6 Drawing Sheets

TUNABLE IMPACT FEATURE IN AUTOMOTIVE LAMPS

BACKGROUND

Field of Disclosure

The present disclosure relates to the field of automotive lighting technology, in particular to automotive lamps having an impact feature.

Description of the Related Art

Typically, an impact feature related to automotive lamps allows an elastic deformation in case of collision. The impact features can reduce impact force experienced by a passenger, while ensuring that the headlamps can return, after the collision, in its initial position and is not damaged. Such impact features can be designed for bumper, tail lamp, etc. Conventional impact features are designed to absorb certain amount of force without braking. Typically, a part failure is not expected to happen.

In certain impact situations, a part failure may be desirable. A designed part failure and fracture can act as an impact feature. However, designed part failure types of impact features pose several manufacturing challenges when using the conventional two-shot manufacturing process. The design is often imprecise and the results are unknown till the testing process is complete. As such, it can be expensive and time consuming process.

Thus, an efficient and tunable impact feature that can be incorporated in a part is necessary. Also, a manufacturing process without significant modifications in manufacturing equipment is highly desirable.

SUMMARY

According to an embodiment of the present disclosure, there is provided an apparatus for an automotive lamp. The apparatus includes a housing made of plastic having an impact groove formed on a surface of the housing, wherein the impact groove is designed as a function of a depth, a width, a desired force, a cross section, and a profile to cause a designed rupture upon application of an applied force.

Further, according to an embodiment of the present disclosure, there is provided a method for manufacturing an impact groove on a housing. The method includes determining a location of the impact groove location and a profile on the housing, tuning parameters of the impact groove, performing stress analysis and determining failure conditions, determining whether failure requirements are met; selecting a slide face insert matching the impact groove; installing the slide face insert in a cast of the housing used for injection molding, performing one-shot injection molding process, and allowing the housing to cool before removing the housing from the cast.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

Figure 1:
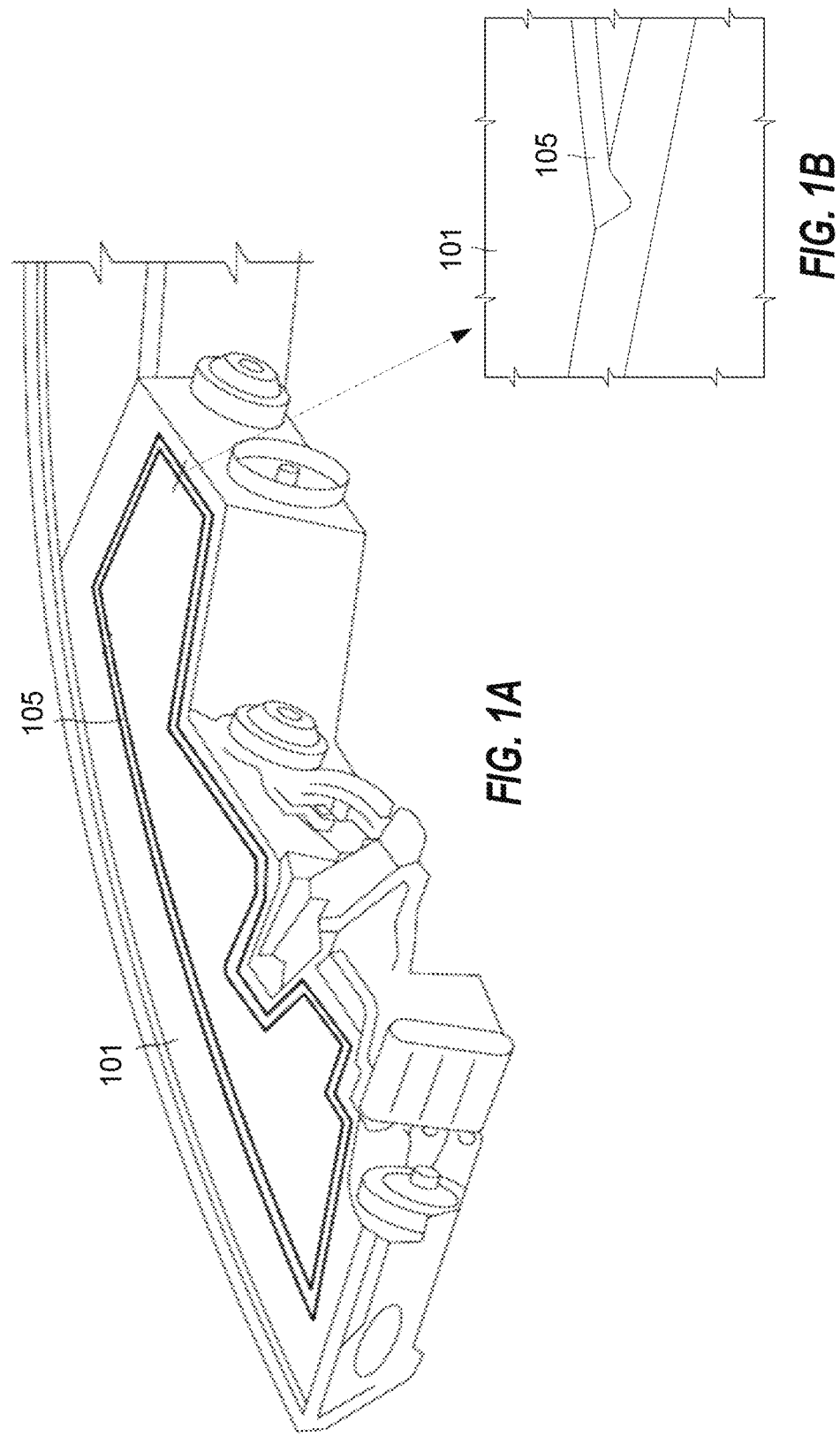
FIG. 1A is a perspective illustration of a housing with an impact feature according to an exemplary embodiment of the present disclosure.
FIG. 1B is a cross section of the impact feature according to an exemplary embodiment of the present disclosure.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper,"

"lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

A part (e.g., a lamp housing) having an impact feature of a type involving a part failure (or rupture) is typically imprecise. Such impact feature requires manufacturing and testing of the part until the failure conditions are reached. For example, the failure condition can be a force threshold and/or a failure location. Based on the testing results, the impact feature must be modified until the desired results are obtained. As such, the process involves several repetitions of steps such as modifying the design of the part, manufacturing the part and testing the part. Such repetitive process can get expensive quickly.

Furthermore, the impact feature is typically manufactured using a two-shot injection molding process, which may require significant changes to cast of the part (e.g., the cast of the lamp housing). Further, to obtain a desired impact feature, several repetitions involving design changes, which may result in several cast changes for manufacturing purposes, may be required. As such, the process can be costly and time consuming. For example, a cast change can cost more than $400,000 and may take up to 20 weeks to manufacture a new cast.

In addition, use of the two-shot injection molding process can cause leakage in the parts due to imperfect bonding of the material at the impact feature. Further, surface finish and galling issues are encountered during manufacturing of the impact feature on the part (e.g., the lamp housing). Thus, a less expensive and less time consuming manufacturing approach is essential to enable implementation of the impact feature.

FIG. 1 is a perspective illustration of a housing with an impact groove according to an exemplary embodiment of the present disclosure. A housing 101 can be a cover for a lamp such as the tail lamp, or a headlight of an automotive. The housing 101 is formed by a molding process such as an injection molding. The shape and size of the lamp housing 101 can vary depending on the type of lamp and type and brand of a vehicle. For example, a tail lamp will have a significantly different profile than a headlight housing. Similarly, a TOYOTA LEXUS will have a significantly different housing than an for an AUDI A4. As such, casts used for manufacturing the housing 101 differs as well. Typically, such casts are expensive and not easy to modify to create additional feature, if required. The present disclosure overcomes this problem of expensive and time consuming manufacturing changes.

According to the present disclosure, the housing 101 includes an impact groove 105. The impact groove 105 is a designed failure mechanism incorporated into a component (e.g., the housing 101). The impact groove 105 provides a safety feature for the component (e.g., the housing 101) to satisfy certain safety requirements upon vehicle impact such as for pedestrian safety. The impact groove 105 is confined to the constraints presented by the housing 101 and limited by the manufacturing constraints posed by the existing castings of the housing 101. The impact groove 105 can be formed on a top, a bottom, or a side surface of the housing 101.

The impact groove 105 is a function of a shape of the housing 101, an external force, a desired force, a depth, a width, a stress concentration and a profile defined to satisfy the standard safety requirements when there is an impact. The desired force is a force that satisfies the safety requirements. The desired force is a force at which a rupture of the impact groove is expected to occur. The profile of the impact groove 105 refers to a geometric shape of the impact groove. The impact groove 105 can have a closed profile formed on the top surface of the housing 101 and can take the form of the housing 101's outer edge. Alternatively or in addition, the impact groove 105 can be rectangular, circular, star shaped or other geometric shapes.

The tuning of above parameters of the impact groove 105 are highly desirable to meet the safety requirements. Such tuning of parameters is achievable by a slide face insert 500 (in FIG. 5), as it allows manufacturing of different variations of the impact groove 105 at low cost and less time.

Figure 2:
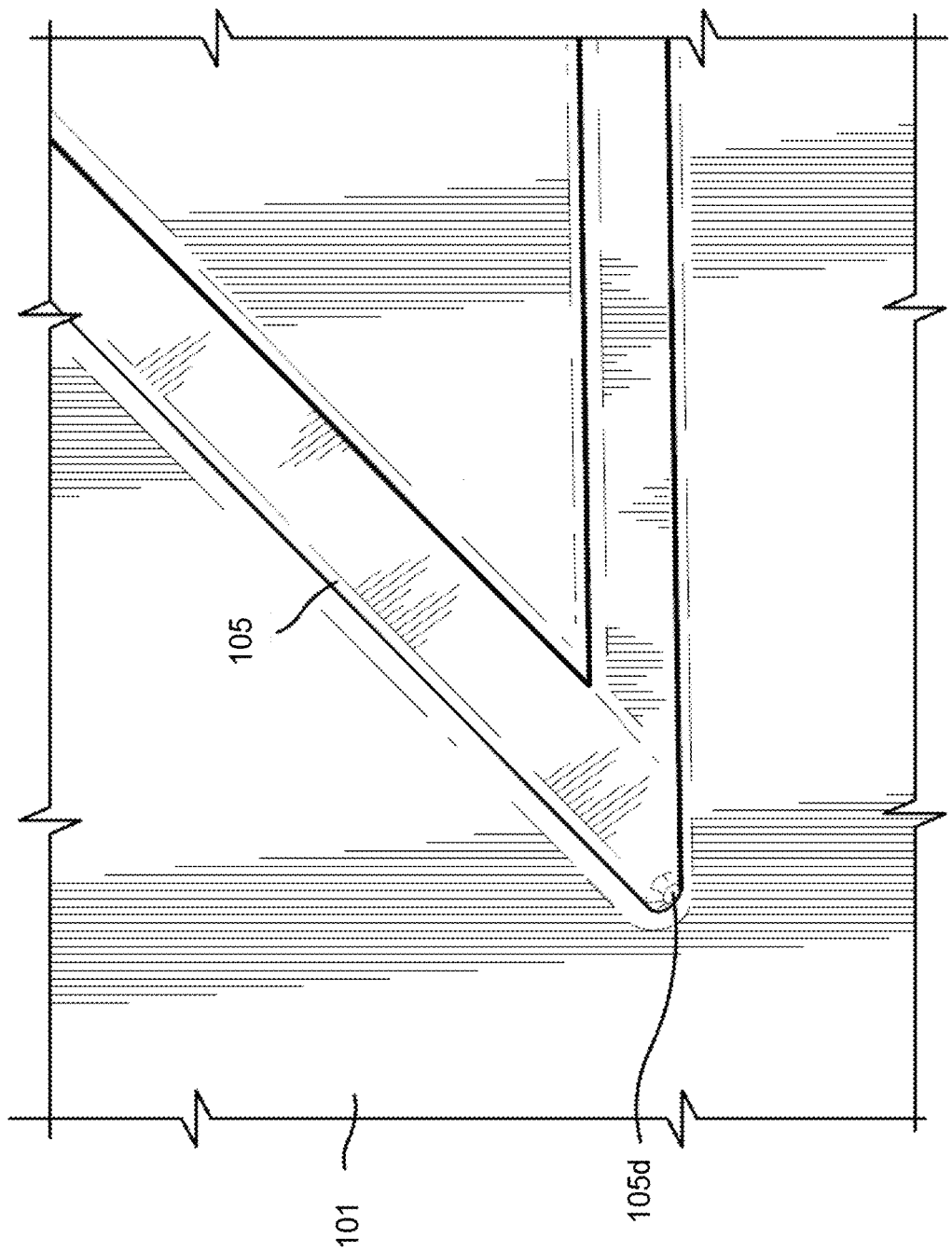
FIG. 2 illustrates a corner of the impact groove of FIG. 1 according to an exemplary embodiment of the present disclosure.

Optionally, referring to FIG. 2, a dimple 105d can be formed along the impact groove 105 at certain locations to increase a stress concentration at that location to cause a failure. For example, the dimple 105d can be formed at an intersection point of segments of the impact groove 105.

Figure 4:
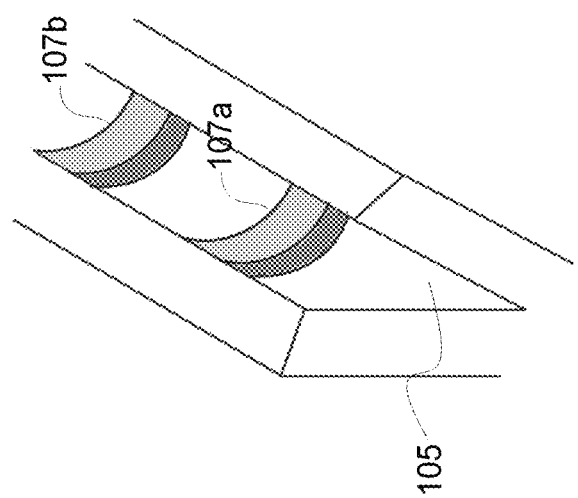
FIG. 4 illustrates the impact groove with ribs according to an exemplary embodiment of the present disclosure.

The impact groove 105 can induce weakness in the housing 101 and may cause failure in unintended locations. As such, referring to FIG. 4, ribs 107a and 107b can be incorporated to reinforce certain parts of the impact groove 105, so that an unintentional failure will not occur.

Figure 3:
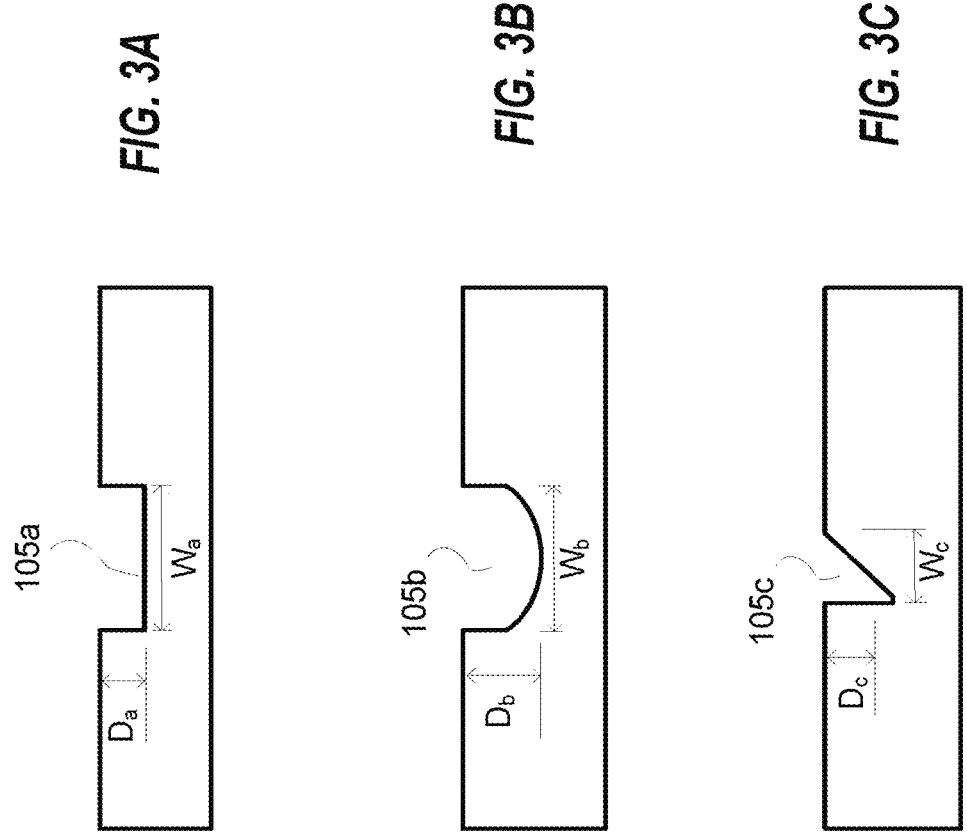
FIG. 3A illustrates a first variation of the impact groove variations according to an exemplary embodiment of the present disclosure.
FIG. 3B illustrates a second variation of the impact groove variations according to an exemplary embodiment of the present disclosure.
FIG. 3C illustrates a third variation of the impact groove variations according to an exemplary embodiment of the present disclosure.

The impact groove 105 can be of different shape and size. For example, referring to FIG. 3A, the impact groove 105 can have a rectangular cross-section 105a having a depth $D_a$ and width $W_a$. Referring to FIG. 3B, the impact groove 105 can have a cup-shaped cross-section 105b having a depth $D_b$ and width $W_b$. Furthermore, referring to FIG. 3C, the impact groove 105 can have a V-shaped cross-section 105c having a depth $D_c$ and width $W_c$.

The impact groove 105 can have a uniform depth and width along the entire length of the impact groove. Alternatively or in addition, the depth and/or the width of the impact groove can vary along its length.

Upon impact to the housing 101, failure such as breakage or rupture can occur at one or more location of the impact groove 105. For example, on a frontal impact, the breakage can occur along a front edge of the impact groove.

Tunable parameters of the impact groove include cross sectional shape, longitudinal shape, depth relative to the housing thickness, orientation of the impact groove with respect to an expected impact force. Stress studies may be performed to estimate the various parameters of the impact groove to achieve a desired impact function. As noted above, however, it is difficult to predict the precise parameter values for achieving a desired function of an impact groove on a particular part, making retooling necessary after a sample part is actually produced. In order to reduce the expense associated with such retooling, the inventors developed replaceable slide face inserts that may be used with a generic part mold to "tune" the impact groove for a desired function without the need for creating a new mold for each attempt to meet the desired function of the impact groove.

Figure 5:
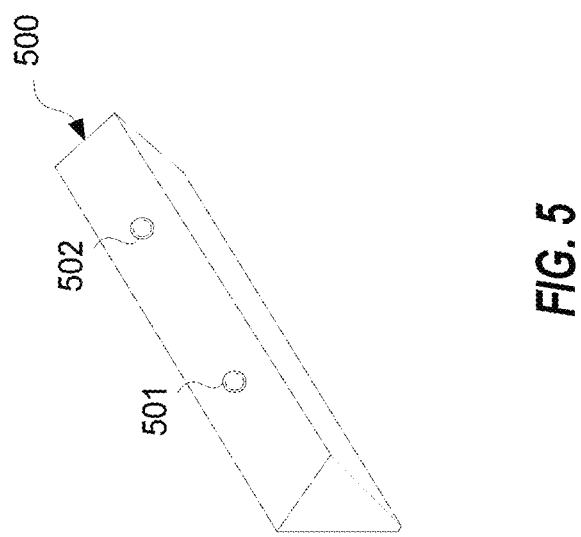
FIG. 5 illustrates a slide face insert matching an impact groove according to an exemplary embodiment of the present disclosure.

FIG. 5 illustrates the slide face insert 500 matching the impact groove 105c according to an exemplary embodiment of the present disclosure. The slide face insert 500 is a male component having a cross section and a profile matching to the impact groove 105. The slide face insert 500 matches the geometry of the impact groove 105 such as the profile, the depth and the width of the impact groove 105 while taking into account the tolerances specific to the plastic molding process. The tolerances can include a shrinkage factor, a process type (e.g., one-shot process vs two-shot process), rate of cooling, material used, etc. Furthermore, the tolerances can be related to shrinkage of the plastic upon cooling, expansion or contraction while removing the insert or other similar factors. The slide face insert 500 is a detachable component used during the molding process to create the impact groove 105c. The slide face insert 500 can be easily attached and detached from an existing cast of the housing 101. Several fastening methods can be used to attach the slide face insert 500. For example, threaded holes 501 and 502 may be created to attach the slide face insert 500 via a screw. Alternatively or in addition, other fastening methods such as screws, studs, rivets, adhesive, etc. can be used.

The slide face insert 500 can be made of alloys or metal such as steel. One or more slide face inserts can be manufactured and attached together to create the impact groove 105. The use of slide face insert 500 for manufacturing the impact groove 105 enables use of a one-shot injection molding process. Without the slide face insert 500, a two-shot injection molding must be used which will be extremely expensive and time consuming; as the two-shot process entails significant modifications to the cast of the housing 101.

Figure 6:
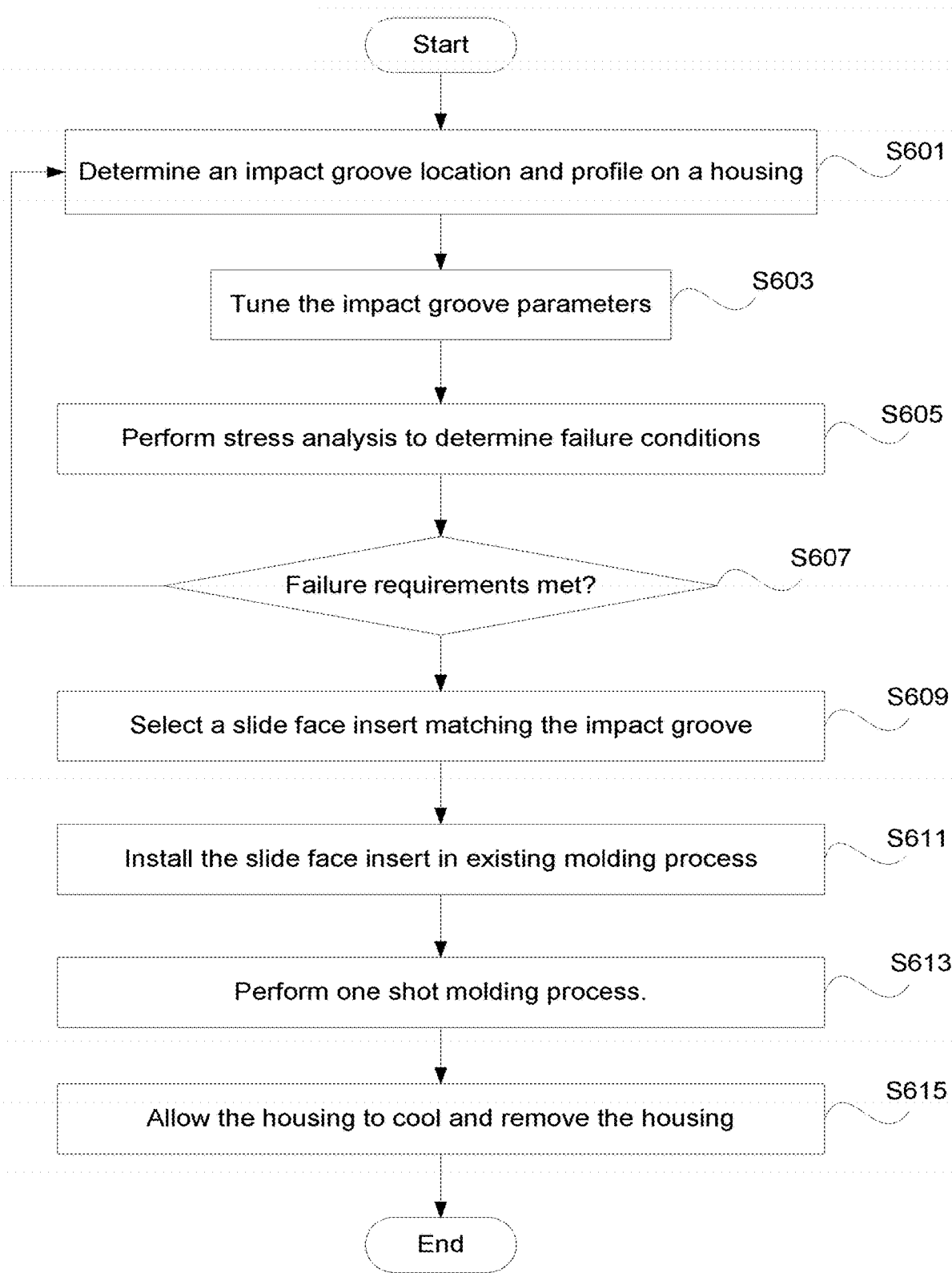
FIG. 6 is a flow chart of method of manufacturing the improved joint and the impact groove according to an exemplary embodiment of the present disclosure.

FIG. 6 is a flow chart of a method for manufacturing the impact groove 105 according to an exemplary embodiment of the present disclosure. The process starts when the housing 101 and its shape and size, and other geometric parameters are known.

In step S601, the location of impact groove 105 and its profile on the housing 101 is determined. For example, the location of the impact groove 105 can be on the top side or bottom side of the housing 101. Further, the profile can be a closed profile having a form similar to the periphery of the housing 101, a rectangular shape, a star shape, or an open cross section such as a cross shape or a line.

In step S603, the impact groove 105 parameters including, but not limited to, the cross-section, depth, width, ribs (add or omit), and the profile, and location can be tuned. During the tuning, the depth or the width can be increased to cause failure at a lower impact force. For example, the ratio of depth of the impact groove 105 to the thickness of the housing 101 can be 0.5 to cause a failure at the impact groove 105 at a force significantly lower than that required to cause failure in the housing 101 with no impact groove 105. Alternatively, a rib may be added at a certain location or at the center of the longest edge of the impact groove 105 as a reinforcement to prevent failure at that location. The rib may be needed at locations where the stress concentration can be higher that other locations along the impact groove 105, as it may cause a failure at a lower force than desired. The stress concentration can be a function of the forces acting on the housing 101, and the impact groove 105 parameters.

In step S605, a stress analysis is performed on the housing 101 having the impact groove 105, which was tuned as in step S603, to determine failure conditions. The failure conditions can be a location of failure, the direction and magnitude of forces, amount of stress and strain at the failure location as well as at other locations, etc. The stress analysis can be performed on a prototype of the housing 101 that is subjected to different impact conditions such as a force magnitude and direction. The prototype can be manufactured by executing steps S609, S611, S613 and S615, described below. Alternatively or in addition, stress analysis can be performed using computer aided design (CAD) software.

In step S607, a determination is made whether the failure requirements of the housing 101 are met. If the failure does not occurs at the desired force or location, then the impact groove parameters are tuned as discussed in step S603. If the failure requirements are met, the housing 101 can be manufactured using the impact groove 105 parameters determined in step S603. The manufacturing process of the impact groove 105 is discussed below.

In step S609, a slide face insert 500 matching the impact groove 105 is selected. In step S611, the slide face insert 500 is installed in existing cast of the housing 101. The slide face insert 500 is removable, hence it allows trying of different variations in the impact groove 105 without making significant modifications in the cast of the housing 101. As such, making the manufacturing process significantly cheaper and less time consuming.

In step S613, one-shot molding process can be performed to manufacture the housing 101 with the impact groove 105. The one-shot molding process creates a uniform groove without the disadvantages of the two-shot molding processes. One of the disadvantages of the two-shot molding process is the joint quality between the first shot and the second shot is poor, which may cause undesired rupture of the housing 101 at lower forces than desired. In step S615, the housing 101 is allowed to cool before removing the housing 101.

A rheology simulation indicates that the one-shot molding process can be performed at an injection pressure up to 90 Mpa. The one-shot molding eliminates weld lines, which are typically observed in two-shot process, thus eliminating one possible leak path. Also, the simulation results indicate that the one-shot molding, the injection can be performed at a faster rate compared to the two-shot process.

The above process has several advantages over the two-shot injection molding process. Conventionally, injection molding is performed from a thick section to a thin section of a component to get a high quality component. Gating from the thin section to the thick section hinders packing of thicker section and can create flow problems, hence not recommended. However, the process in FIG. 6 allows injection molding to be performed from the thin section to a thick section without affecting the quality of the component. Using one-shot process with the slide face insert 500 can create the impact groove 105 with minimum to no flow problems, packing issues, draft issue, jetting issue, etc.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. An apparatus for an automotive lamp comprising:
   a housing made of plastic having an impact groove formed on a surface of the housing by a slide face insert attached to a cast of the housing formed by a one-shot molding process, wherein the impact groove is designed as a function of a depth, a width, a desired force, a cross section, and a profile to cause a designed rupture upon application of an applied force, wherein the impact groove includes a dimple at a corner of the profile of the impact groove.

2. The apparatus according to claim 1, wherein the depth of the impact groove is a function of a desired force, which is a force at which a rupture should occur, and the cross section of the impact groove.

3. The apparatus according to claim 2, wherein the cross section of the impact groove is a V-shape.

4. The apparatus according to claim 1, wherein a width of the impact groove is a function of the desired force, which is a force at which a rupture should occur, required to cause a rupture and the cross section of the impact groove.

5. The apparatus according to claim 1, wherein the impact groove includes one or more ribs disposed inside the impact groove.

6. An automotive lamp comprising:
a lamp;
a housing made of plastic having an impact groove formed on a top or a bottom surface of the housing by a slide face insert attached to a cast of the housing and a one-shot molding process, wherein the impact groove is designed to cause a rupture upon an external force and wherein the impact groove includes a dimple at a corner of a profile of the impact groove.

7. The automotive lamp according to claim 6, wherein a depth of the impact groove is a function of a desired force, which is a force at which a rupture should occur, and the impact groove cross section.

8. The automotive lamp according to claim 7, wherein the cross section of the impact groove is at least one of V-shape, cup-shape and rectangular shape.

9. The automotive lamp according to claim 6, wherein a width of the impact groove is a function of the desired force and the impact groove cross section.

10. The automotive lamp according to claim 6, wherein the impact groove includes at least one rib disposed inside the impact groove.

11. The apparatus according to claim 2, wherein the cross section of the impact groove is a cup-shape.

12. The apparatus according to claim 2, wherein the cross section of the impact groove has a varying depth and width along a length of the impact groove.

* * * * *